(12) United States Patent
Dong et al.

(10) Patent No.: US 8,483,992 B2
(45) Date of Patent: Jul. 9, 2013

(54) ANALYTICAL COMPUTATION OF GEOMETRIC NORMALIZATION FACTOR FOR TOF-PET

(75) Inventors: Yun Dong, Mundelein, IL (US); Wenli Wang, Briarcliff Manor, NY (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 232 days.

(21) Appl. No.: 13/096,672

(22) Filed: Apr. 28, 2011

(65) Prior Publication Data

US 2012/0278034 A1  Nov. 1, 2012

(51) Int. Cl.
 *G06F 15/00* (2006.01)
(52) U.S. Cl.
 USPC .................. 702/152; 250/363.07; 382/131
(58) Field of Classification Search
 USPC ............... 702/152, 85, 94, 95, 151; 382/128, 382/129, 130, 131; 250/362, 363.03, 363.04, 250/363.07
 See application file for complete search history.

(56) References Cited

U.S. PATENT DOCUMENTS

| 7,627,082 B2 * | 12/2009 | Kojima et al. ................. 378/19 |
| 7,718,954 B2 * | 5/2010 | Wang et al. ................ 250/252.1 |
| 2011/0135179 A1 * | 6/2011 | Ross et al. .................... 382/131 |

OTHER PUBLICATIONS

R.D. Badawi, et al. "Developments in Component-Based Normalization for 3D PET", Phys. Med. Biol. 44 (1999) pp. 571-594. Printed in the UK.

* cited by examiner

*Primary Examiner* — Michael Nghiem
*Assistant Examiner* — Stephanie Bloss
(74) *Attorney, Agent, or Firm* — Oblon, Spivak, McClelland, Maier & Neustadt, L.L.P.

(57) ABSTRACT

A method, including: determining a line of response for an imaging apparatus, the line of response being defined by respective locations of a pair of detector crystals of the imaging apparatus; defining an array of emission points corresponding to the determined line of response; determining, for each point in the array of emission points corresponding to the line of response, a solid angle subtended by surfaces of the pair of detector crystals that define the line of response; averaging the determined solid angles to generate an average solid angle; determining a depth of interaction factor dependent upon penetration of a gamma ray in the pair of detector crystals of the imaging apparatus; and calculating a geometric corrective factor for the determined line of response by multiplying a reciprocal of the average solid angle by the determined depth of interaction factor.

20 Claims, 15 Drawing Sheets

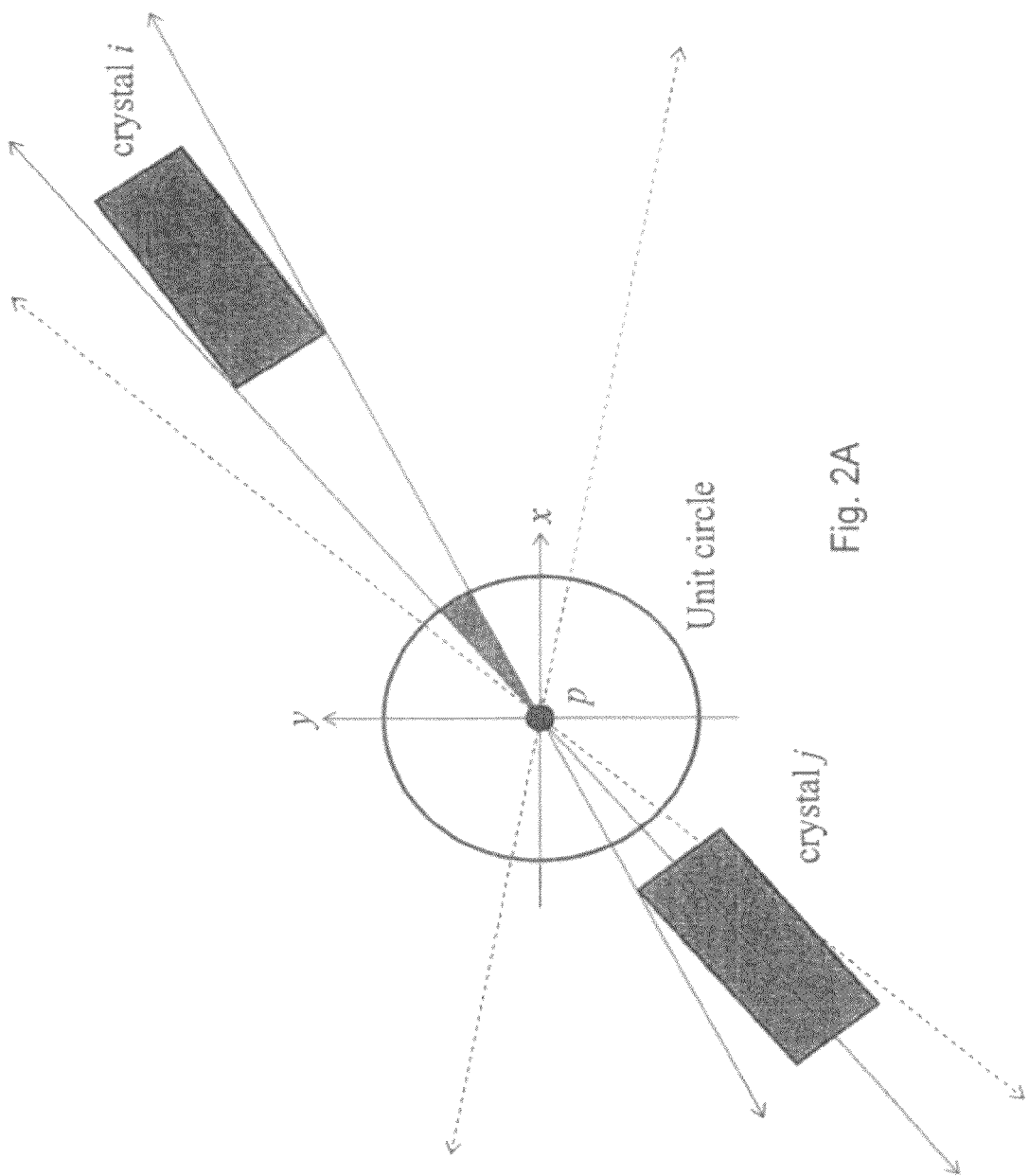

ANALYTICAL COMPUTATION OF GEOMETRIC NORMALIZATION FACTOR FOR TOF-PET

FIELD

Embodiments described herein relate generally to the reconstruction of data acquired in a gamma ray detection system.

BACKGROUND

Positron emission tomography (PET) is a branch of nuclear medicine in which a positron-emitting radiopharmaceutical is introduced into the body of a patient. As the radiopharmaceutical decays, positrons are generated. More specifically, each of a plurality of positrons reacts with an electron in what is known as a positron annihilation event, thereby generating a coincident pair of gamma photons which travel substantially in opposite directions along a line of coincidence. A gamma photon pair detected within a coincidence time is ordinarily recorded by the PET scanner as an annihilation event. In time of flight ("TOF") imaging, the time within the coincidence interval at which each gamma photon in the coincident pair is detected is also measured. The time of flight information provides an indication of the location of the detected event along the line of coincidence. Data from a plurality of annihilation events is used to reconstruct or create images of the patient or object scanned, typically by using statistical (iterative) or analytical reconstruction algorithms.

FIG. 1 illustrates the transaxial and axial coordinates of an emitted positron and the measured line of response (LOR) of a 3D detector. The coordinates $(x_e, y_e, z_e)$ or $(s_e, t_e, z_e)$ define the emitted positron's image coordinate. The measured LOR's projection coordinate can be defined by either $(s, \phi, z, \theta)$, where $z=(z_a+z_b)/2$, or may include the additional dimension t for a TOF-LOR. In these types of PET imaging devices, besides the variation in the detector efficiency of an individual crystal, the detection efficiency of the overall scanner is determined by geometric factors, which in turn depend on the solid angle formed by the area, the distance of a detector crystal to the emission point, and the incident angle of the LOR into the crystal.

The solid angle is a two-dimensional angle in three-dimensional space that an object subtends at a point. Mathematically, the solid angle $\Omega$ subtended by a surface S is written as, $$\Omega \equiv \iint_S \frac{\hat{n} \cdot da}{r^2}, \quad (1)$$

where $\hat{n}$ is a unit vector from the point, da is the differential area of a surface patch, and r is the distance from the origin to the patch. The solid angle is a measure of how large that object appears to an observer looking from that point. An object's solid angle is equal to the area of the segment of unit sphere (centered at the vertex of the angle) restricted by the object (this definition works in any dimension, including 1D and 2D). FIG. 2A illustrates the concept of the solid angle used in the detection of coincidence events of PET. The illustrated solid section in the unit circle represents the solid angle of crystal pair (i,j), or $LOR_{ij}$, measured from point "p". Thus, in the PET scanner shown in FIG. 1, the solid angle of the LOR depends on the emission point position, defined by $(s_e, t_e, z_e)$. The $(s_e, t_e)$ coordinates define the emission point position in the transverse plane (left sub-figure of FIG. 1). The $z_e$ coordinate defines the position in the axial direction of the scanner. The solid angle of the LOR increases toward the edge of the transaxial field of view, i.e., at large |s|.

When two gamma rays from the emission position individually hit two crystals of the LOR, both incident angles of two gamma rays determine the incident angle of the LOR. Each incident angle of the gamma ray can be explained by the polar angle $\alpha$ and the azimuthal angle $\beta$, as shown in FIG. 2B. Both angles $\alpha$ and $\beta$ depend on the relationship between the flight direction of the gamma ray and the normal of the crystal surface at which the gamma ray enters. As angle $\alpha$ or $\beta$ increases, the incident angle of the gamma ray also increases. The incident angle of the gamma ray determines the amount of penetration of the gamma ray into the crystal, i.e., the depth-of-interaction (DOI). As a result, when there is a larger |s| or larger $\theta$, the normal of one crystal of the LOR is changed so that the angle $\alpha$ or $\beta$ is increased, and DOI effects are then changed. This situation is characterized as the LOR being more aligned.

Additionally, the geometric factors are also affected by crystal positions of the LOR in the detector block. When crystals of the LOR are closer to the edge of the detector block, one side face of the detector block contributes more effects to the solid angle and the incident angle than crystals of the LOR on the front face of a detector block.

A geometric correction factor used to correct raw measured data may be determined by obtaining high-count planar or rotating line data. The raw count data are first corrected for source geometry, attenuation, and individual crystal efficiency variation. Then, radial profiles along s are generated per slice as a function of ring difference $(z_b-z_a)$. These radial profiles are then inverted and applied directly as the geometric correction factor.

In the conventional measurement approach, a planar source is placed at the center, or a transmission line source is rotated, to measure the correction factor, as shown in FIG. 3. Data for the geometric correction factor are collected for all detector pairs by exposing them to a planar source. The correction factor is computed based on a ratio of the average coincidence counts measured for all LORs to the counts for a particular LOR. However, the measurement approach of using either the planar source or the rotated transmission line source has some limitations. First, for the normalization of a TOF-PET scanner, when using a measurement technique to capture different emission positions, the planar source has to be placed at multiple horizontal locations, or the line source has to be rotated in different radii, as shown in FIG. 4. Using multiple acquisition scans yields several major disadvantages, such as a complicated normalization scan protocol, multiple line or planar source positioning, multiple data acquisition, and much longer scan time, for the normalization of a TOF-PET scanner. Second, although a high-count normalization scan is generally performed to reduce noise, negative effects on final images can still be expected. The noise distribution in normalization data is not uniform, i.e., there is higher noise in LORs having a big ring difference $(z_b-z_a)$. Also, before generating the corrective factor, other corrections are required, such as intrinsic crystal efficiencies. Additional noise can be propagated from these corrections. Moreover, current PET reconstruction is theoretically preferred to include the corrective factor into the system response in order to keep the validity of the Poisson model. Any prior methods with statistical noise will make the reconstruction deviate from the Poisson model. Thus, the resultant PET images may not be optimal from a theoretical point of view.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2A illustrates the concept of a 1D solid angle;

DETAILED DESCRIPTION

In an exemplary embodiment, a method includes: (1) determining a LOR for a PET imaging apparatus, the LOR being defined by respective locations of a pair of detector crystals of the imaging apparatus; (2) defining an array of emission points corresponding to the determined LOR; (3) determining, for each point in the array of emission points corresponding to the LOR, a solid angle subtended by surfaces of the pair of detector crystals that define the LOR; (4) averaging the determined solid angles to generate an average solid angle; (5) determining a DOI factor dependent upon penetration of a gamma ray in the pair of detector crystals of the imaging apparatus; and (6) calculating a geometric corrective factor for the determined LOR by multiplying a reciprocal of the average solid angle by the determined DOI factor. In another exemplary embodiment, a non-transitory computer readable storage medium is encoded with instructions, which when executed by a computer causes the computer to implement the above-noted method. In another exemplary embodiment, an apparatus includes a memory configured to store computer executable instructions, and a computer configured to execute the computer executable instructions in order to perform the above-noted method.

Correction of Non-TOF PET Data

Prior to generating image data through a reconstruction process, raw data generated by a non-TOF PET detector needs to be corrected using a set of geometric correction factors. The nonuniformity of the raw data arises due to the high number of detectors and photomultiplier tubes, the variations in the gain of the photomultiplier tubes, the physical variations of the detectors, and the variations in detection efficiency of detector crystals. Geometry correction factors are applied to the raw count data to correct for such irregularities.

A higher solid angle for an emission point results in greater sensitivity of its detection. In order to form more uniform raw data, the counts attributed to LORs with higher sensitivity LORs can be reduced and the counts attributed to LORs with lower sensitivity LORs can be increased.

Figure 1:
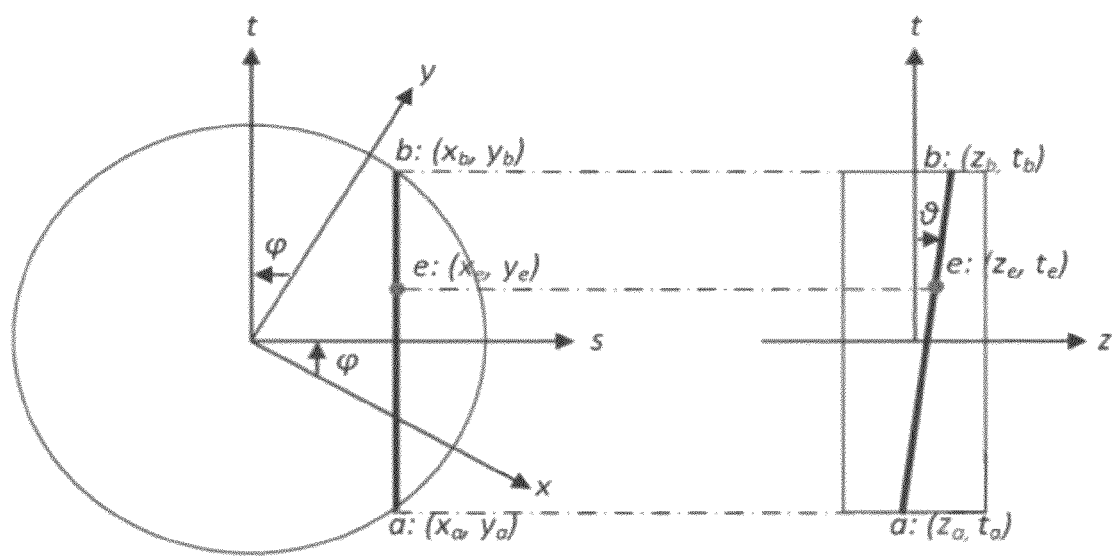
FIG. 1 illustrates an example of a geometry of a PET imaging apparatus.
Figure 2B:
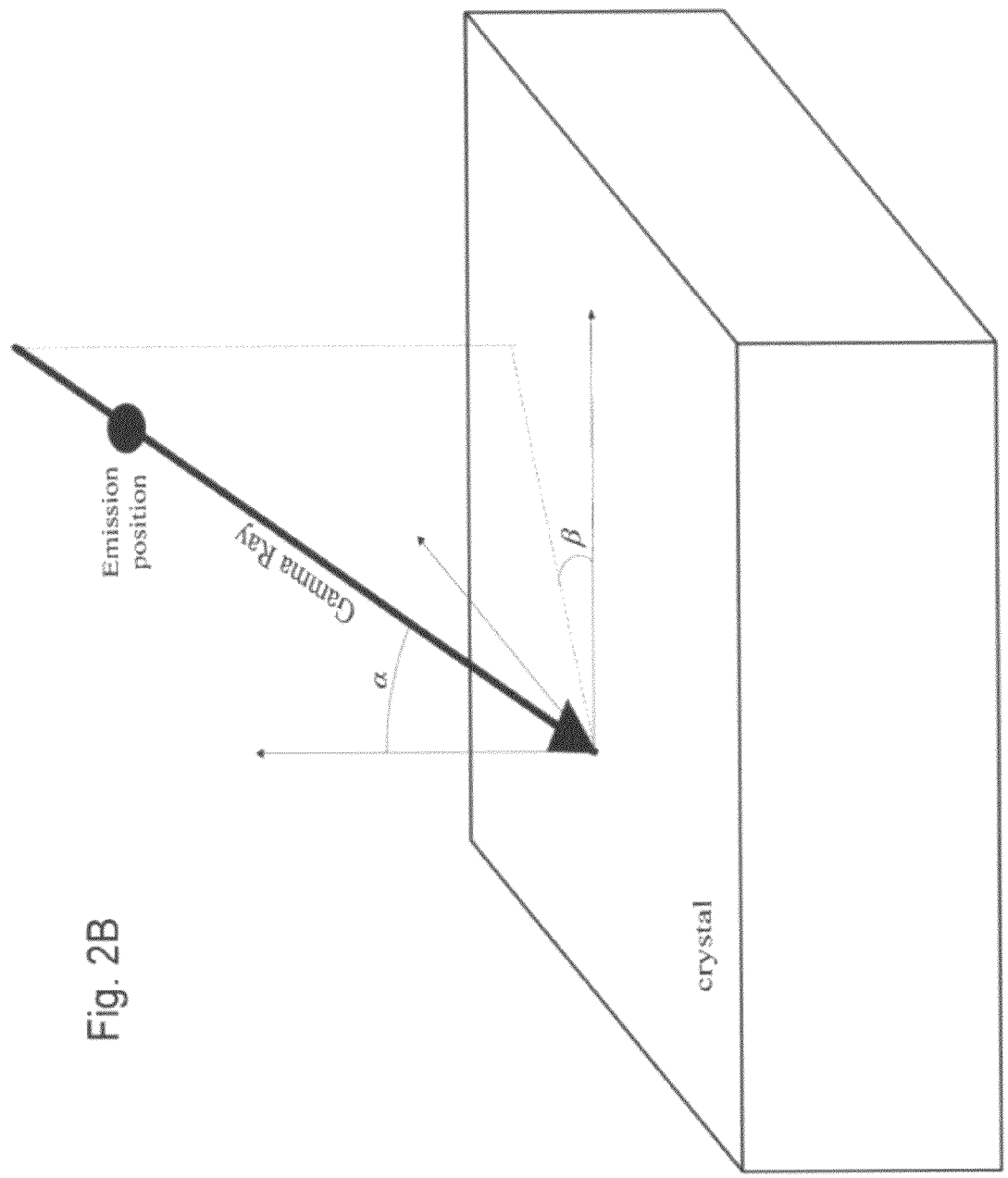
FIG. 2B illustrate an incident angle of a gamma ray.
Figure 3:
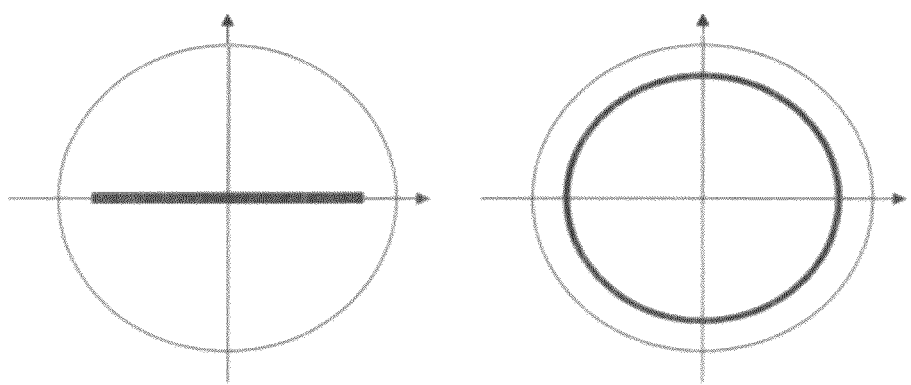
FIG. 3 illustrates a planar photon emission source and a rotation line photon emission source in non TOF-PET imaging apparatuses.
Figure 4:
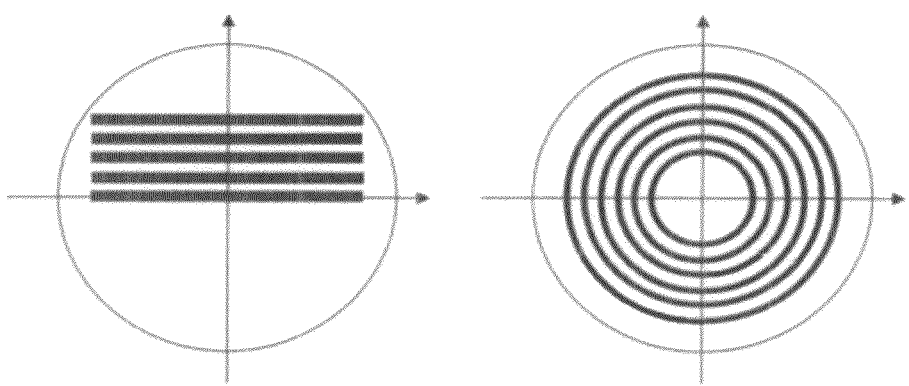
FIG. 4 illustrates plural planar photon emission sources and plural rotation line photon emission sources in TOF-PET imaging apparatuses.

The present technological advancement provides analytically computed geometric correction factors that correct for variations along both the s and t directions shown in FIG. 1. This method is based on analytic computation, not on measurement. The geometric factors depend on solid angle and incident angle. Thus, an exemplary embodiment of this analytic computation factors the geometric correction factor into two sub-factors, as follows:

$$n_g = n_s \times n_d, \quad (2)$$

where $n_s$ is inversely proportional to solid angle which is subtended by the surfaces of paired crystals for detection of coincidence events, and $n_d$ accounts for DOI effects.

$n_s$ and $n_d$ are assumed to be independent of each other. $n_s$ is determined by positions of a $LOR_{ij}$ and emission points, and $n_d$ is determined by scintillation materials, block geometry, relative position of crystal in the block, and the tilt angle θ to the crystal surface for the LOR.

Figure 5:
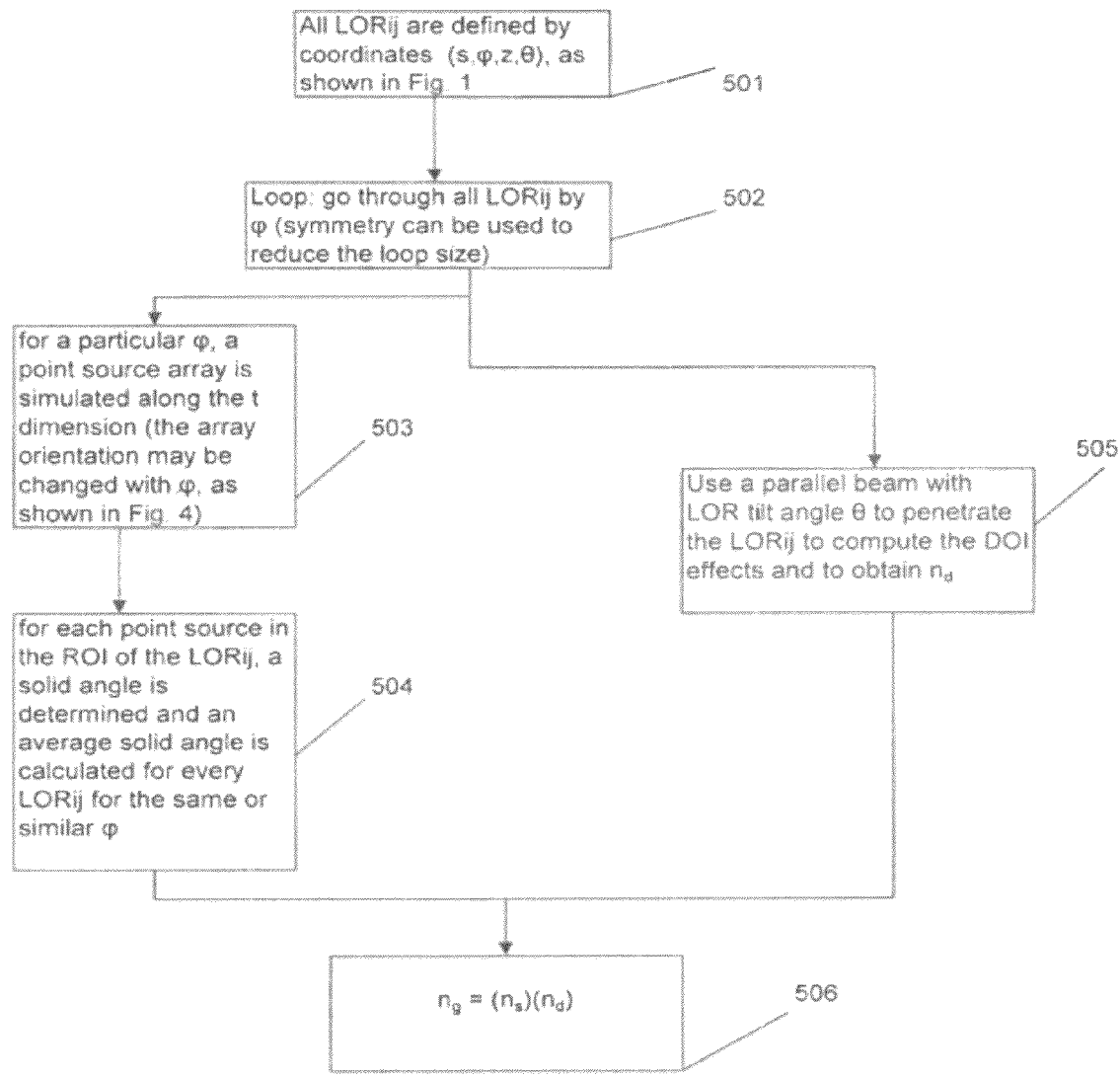
FIG. 5 illustrates a method of calculating a geometric correction factor for non-TOF PET.
Figure 6:
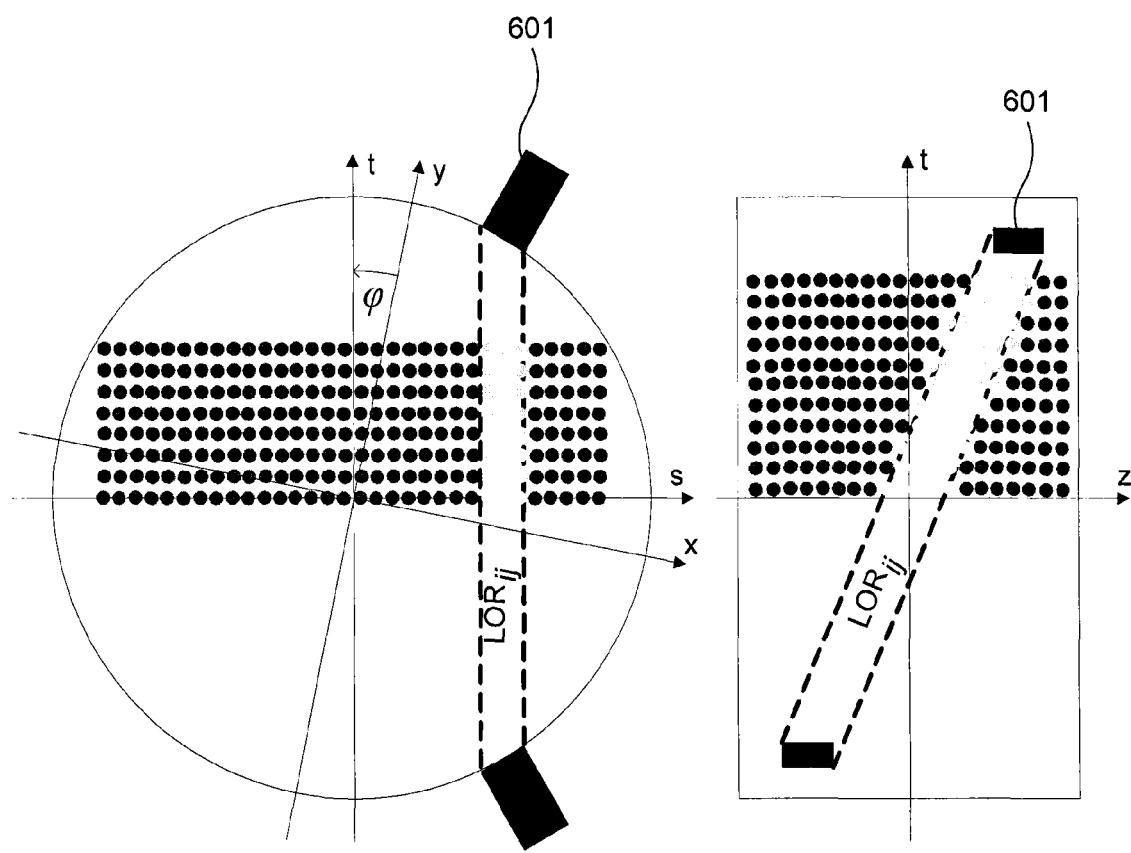
FIG. 6 illustrates a point array in an imaging apparatus.

FIG. 5 illustrates an exemplary method of calculating a corrective factor $n_g$. In step 501, each $LOR_{ij}$ is defined by coordinates (s,φ,z,θ), as shown in FIG. 1. FIG. 6, discussed below, also illustrates an $LOR_{ij}$.

In step 502, all $LOR_{ij}$ are evaluated for a particular φ. The φ symmetry of $n_s$ and $n_d$ is used to reduce the complexity of the calculations, wherein $n_s$ and $n_d$ are the same for every transverse number of crystals in a block detector.

In step 503, for a particular φ, a point source array is simulated along the t and s dimensions. An example of this point source array is illustrated in FIG. 6. In FIG. 6, the black boxes 601 are crystals that define a $LOR_{ij}$ (ij defining a crystal pair). The dashed lines in FIG. 6 identify a region of interest (ROI) of $LOR_{ij}$. The dark and light solid circles represent emission points, or annihilation positions. The light solid circles are the points of the array in the ROI of $LOR_{ij}$. The point array may also extend below the s axis, or symmetry may be used to reduce the number of calculations. Please note that the array orientation changes with φ.

In step 504, for each point source in the ROI of the $LOR_{ij}$, a solid angle is determined. The points for which the solid angle is calculated are the light grey points in FIG. 6. $n_s$ is the reciprocal of average solid angle of all the light grey points in the ROI of the $LOR_{ij}$ in a non-TOF PET scanner embodiment. Every point in the ROI of $LOR_{ij}$ is involved the computation of $n_s$ as the response is considered to be dominated by photoelectric effects. For each point in the ROI of $LOR_{ij}$, the computation of the solid angle is performed based on the point location and front faces of the two crystals defining the $LOR_{ij}$. If one of the crystals is at a boundary of the detector, the boundary effects are considered during the computation of solid angle, i.e., the side face of the crystal may contribute to a bigger solid angle when crystals are located on boundaries. The values of the solid angle for every point in the ROI of $LOR_{ij}$ is averaged together, and this average values is inverted to be used as $n_s$. The calculation of solid angle, which is described in more detail below.

Figure 7A:
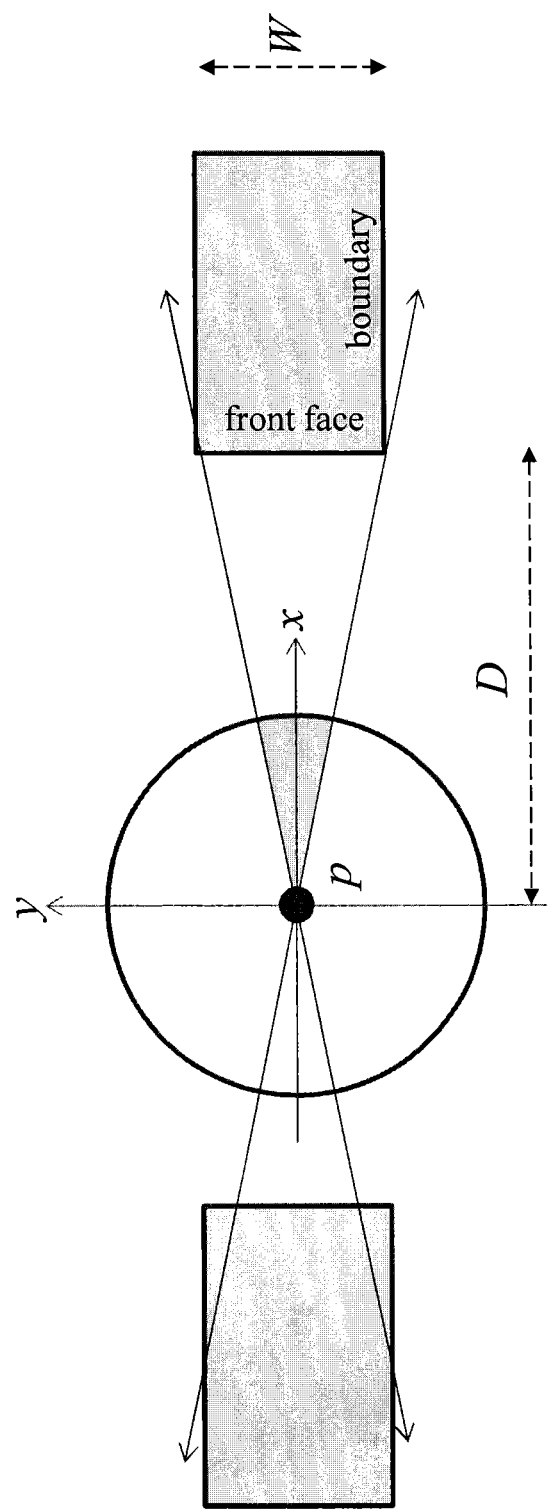
FIGS. 7A-7C illustrate the concept of calculating a solid angle with respect to an imaging apparatus.
Figure 7B:
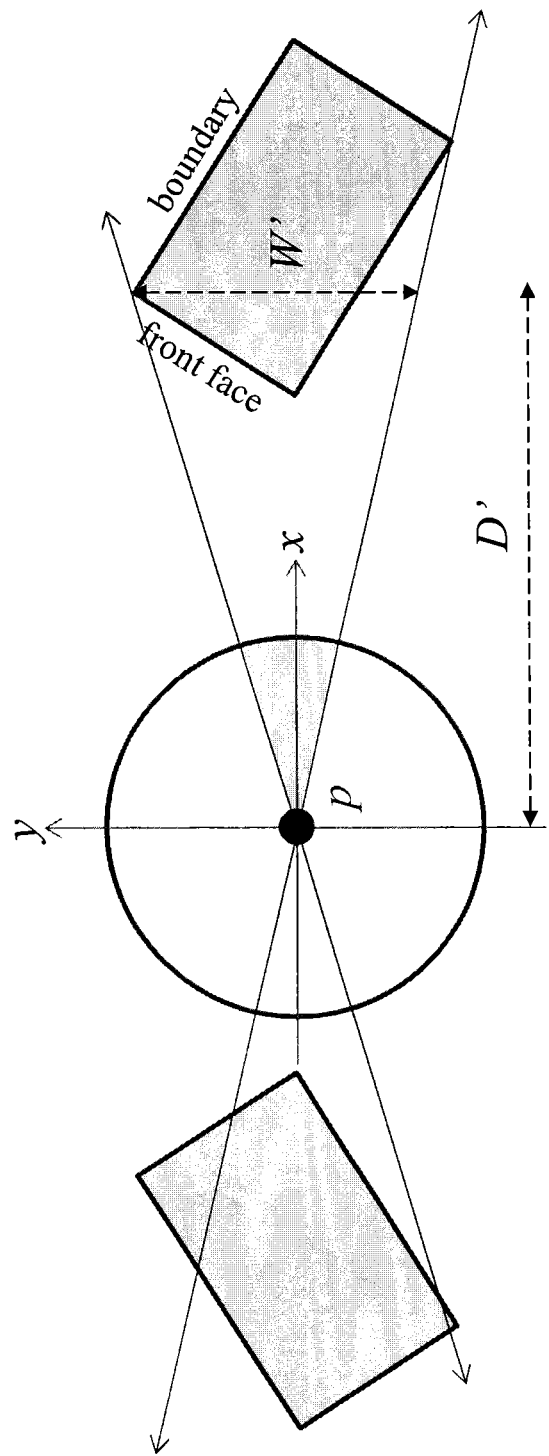
Figure 7C:
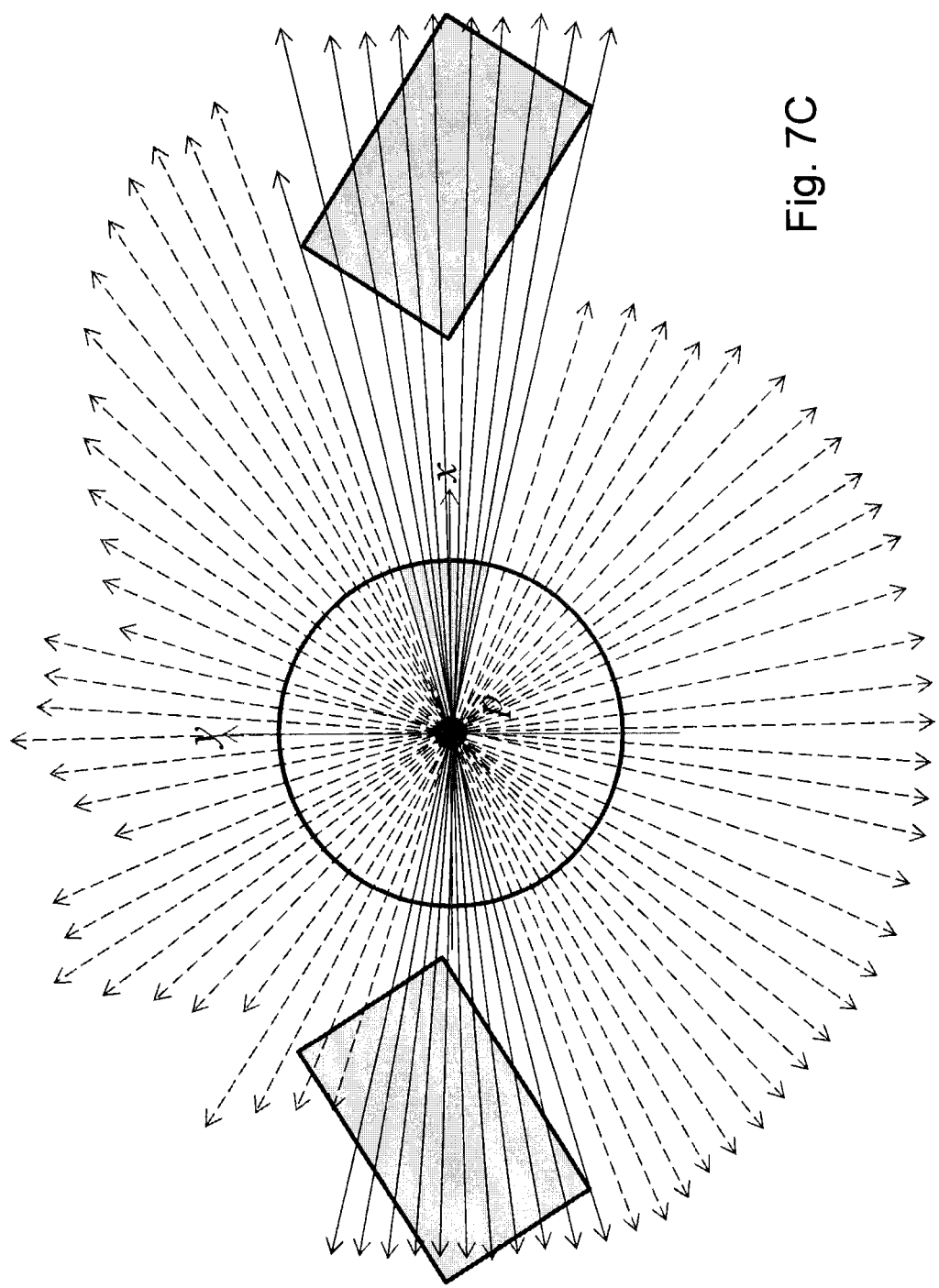

FIG. 7A illustrates how the solid angle may be determined for a right-opposite crystal pair. For a right-opposite crystal pair the coincident solid angle delta is approximately proportional to W divided by D when D>>W. FIG. 7B illustrates how the solid angle may be determined for aligned crystal pairs. For aligned crystal pairs the coincident solid angle delta is approximately proportional to W' divided by D' when D'>>W'. The analytic computation of W' and D' has to consider the boundary and orientation of the crystal pair in the space, and is complicated. FIG. 7C illustrates that the coincident solid angle for aligned crystal pairs is approximately proportional to the ratio of the number of solid lines to the number of total lines (solid+dashed).

Figure 8:
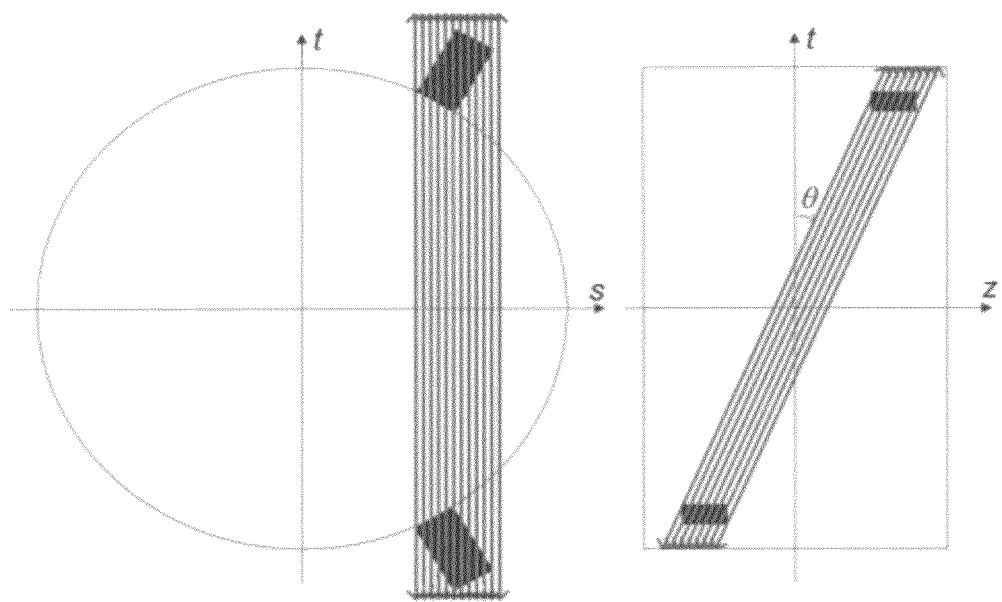
FIG. 8 illustrates a computation of a depth of interaction factor.
Figure 9:
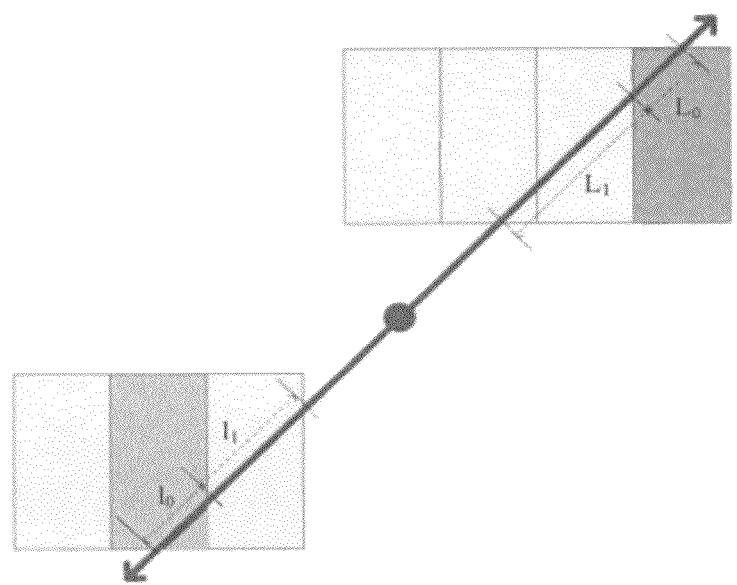
FIG. 9 illustrates a computation of a depth of interaction factor.

The gamma photons have to travel in the detector by some distance that is statistically determined by the detector material and photon energy. This limited travel distance is understood as "penetration," and the sensitivity related to the penetration is $n_d$. Thus, in step 505, a quite fine parallel beam (i.e., the distance between neighboring lines in parallel beams is in a sub-millimeter level) with the tilt angle θ $LOR_{ij}$ is used to penetrate the $LOR_{ij}$ for computation of the intersections of the parallel beam with two crystal individually, as shown in FIG. 8. Each intersection is related to the sensitivity $n_d$ with a simple physical attenuation model. As a result, the computation of $n_d$ is based on every line's intersection with the detector crystals. For each line in the beam, the intersection length in the crystals of a targeted LOR is not only computed, but all travel lengths within other crystal material are also computed. As shown in FIG. 9, the two dark-gray colored crystals define an $LOR_{ij}$ for which the $n_d$ will be computed. The arrows represent the two 511 keV gamma photons. Before the photons reach the targeted crystals, they have already traveled some distance in other crystals. $n_d$ is then computed as $e^{-\mu L_1}(1-e^{-\mu L_0})e^{-\mu l_1}(1-e^{-\mu l_0})$, where μ represents a linear attenuation coefficient provided by the scintillation crystal to absorb the 511 keV gamma-photons.

In step 506, $n_s$ and $n_d$ are multiplied together to form geometric corrective factor $n_g$. To correct the raw data, the geometric corrective factor $n_g$ is inverted and multiplied by the counts detected by the crystal detectors i and j for the $LOR_{ij}$. In accordance with the present technological advancement, as the solid angle is greater, the geometric corrective factor $n_g$ becomes smaller, which in turn lowers the number of counts when the geometric corrective factor $n_g$ is applied to the raw data. Thus, the present technological advancement provides an analytical method of calculating a corrective factor that is able to lower the counts of overly sensitive LORs, and to increase the counts of LORs with low sensitivity.

The above-noted geometric correction factor is based on a 2D non-TOF PET apparatus (wherein all LORs come from the same ring of detectors). However, the above-noted geometric correction factor may be extended to 3D (where there may be oblique LORs coming from different ring combinations). 2D refers to a single ring PET scanner. Even for the single ring, the detector crystals and geometry are still in three dimensions.

When the PET apparatus is designed, the geometric corrective factors are fixed. Thus, a non-limiting embodiment includes a method that allows for pre-calculation of geometric correction factors only once, and the storage of the geometric correction factors that may be accessed by a computer during a subsequent normalization processing.

The analytic method presented above can also be incorporated with other physical models, for example, the positron range, and scatter in the crystals. Fundamentally, this method is an implementation of a calculation of a point spread function (PSF). Thus, this method can be incorporated into PSF computation in reconstruction.

Correction of TOF PET Data

The present technological advancement is also applicable to TOF PET data. In a non-TOF PET scanner, the variation of the solid angle with t is conventionally ignored in the normalization procedure, i.e., the solid angle is assumed not to change along the t dimension. However, the solid angle for the emission point will be varied when the emission point varies along the t dimension. Particularly, for TOF-PET scanners, the variation of solid angle along t has to be corrected; otherwise the resulting image will not be uniform.

The calculation of $n_d$ is identical to the case of the NON-TOF PET. In the TOF PET, the solid angle $n_s$ is calculated in a different way.

Figure 10:
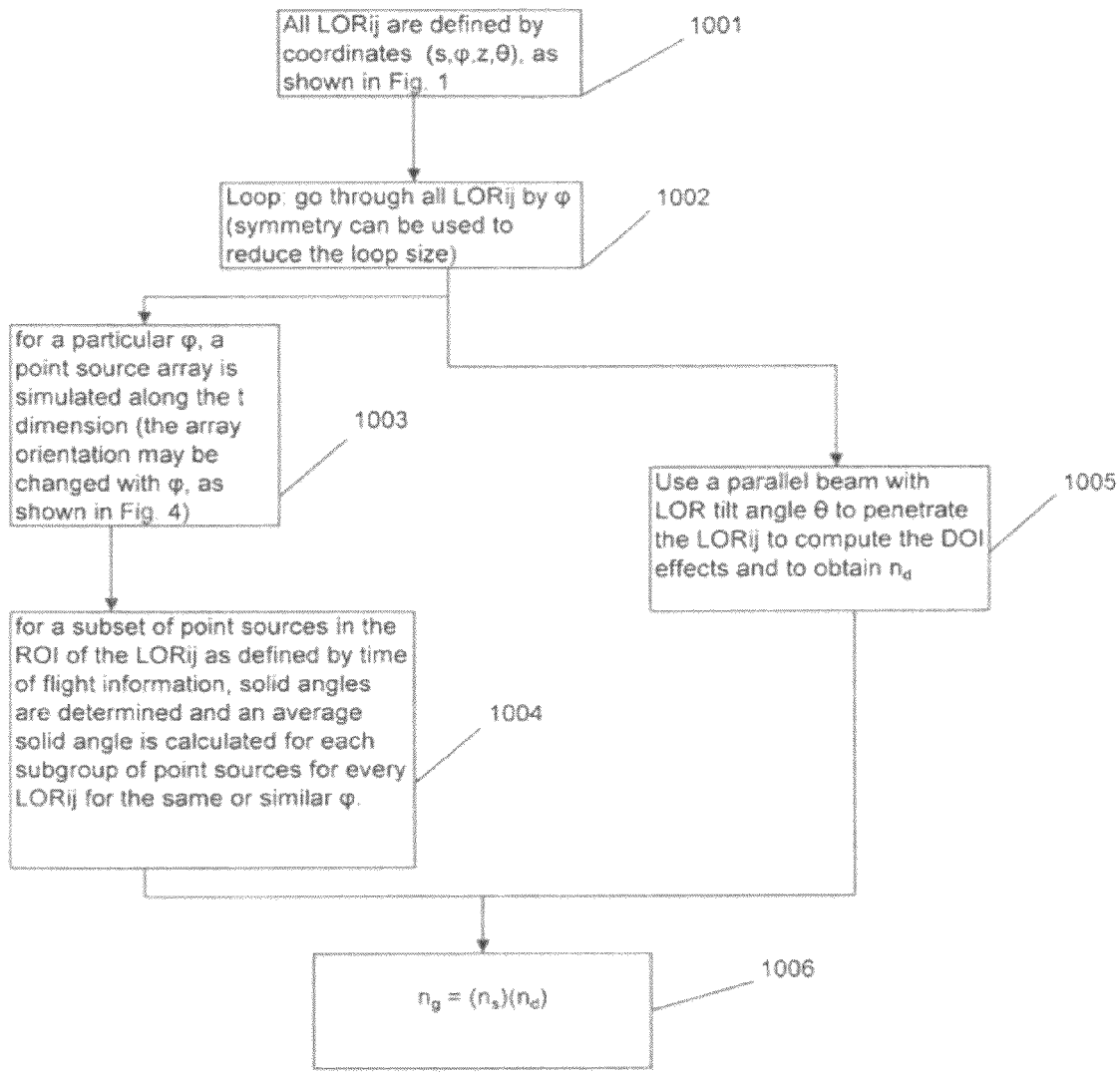
FIG. 10 illustrates an exemplary method of calculating a geometric correction factor for TOF-PET.

FIG. 10 illustrates an exemplary method of calculating a geometric corrective factor $n_g$ for a TOF PET apparatus. The method of FIG. 10 is similar to the method of FIG. 5, and only the differences will be discussed in detail.

In step 1001, each $LOR_{ij}$ is defined by coordinates (s,φ,z,θ), as shown in FIG. 1.

In step 1002, all $LOR_{ij}$ are evaluated for a particular φ. The φ symmetry of $n_s$ and $n_d$ can be used to reduce the complexity of the calculations.

In step 1003, for a particular φ, a point source array is simulated along the t dimension. The array orientation is changed with φ, as shown in FIG. 6.

Figure 11:
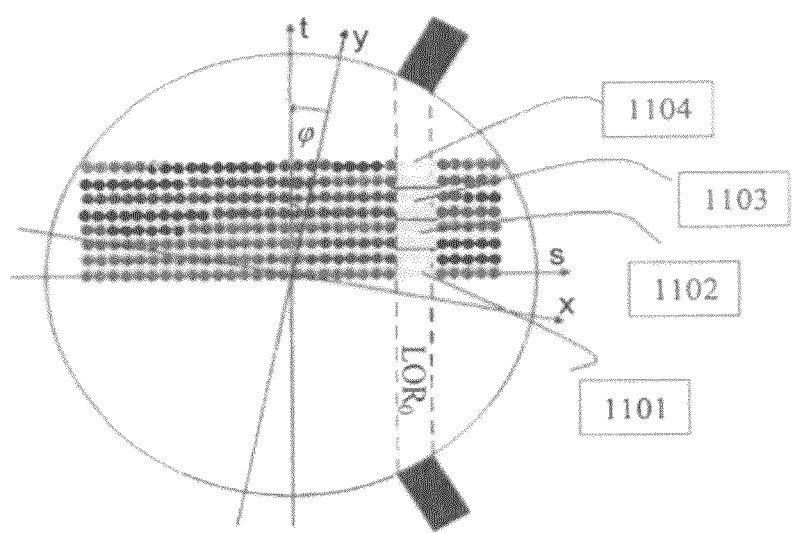
FIG. 11 illustrates a point array in a TOF-PET imaging apparatus.

In step 1004, the timing resolution of the TOF detector is used to divide the ROI and point source array of the $LOR_{ij}$ into separate groups along the orientation of $LOR_{ij}$. FIG. 11 illustrates an example of subgroups of points in the point source array corresponding to the ROI of the $LOR_{ij}$. These subgroups are 1101, 1102, 1103, and 1104.

The solid angles for each point in the point source array corresponding to the ROI of the $LOR_{ij}$ is determined. The points for which the solid angle is calculated are the light grey points in FIG. 11. The solid angles in each of the subgroups are averaged together to determine a plurality of $n_s$ values (i.e., one $n_s$ value for each subgroup).

In step 1005, one parallel beam with the LOR tilt angle θ is used to penetrate the $LOR_{ij}$ for computation of the DOI effects, in order to obtain $n_d$.

In step 1006, $n_s$ and $n_d$ are multiplied together to form geometric corrective factors $n_g$ for the corresponding subgroups within the $LOR_{ij}$. For correction of the count data, the emission point position of one event can be determined by using TOF information of the event, Δt. The position is then used to pick up one $n_s$ from the subgroups 1101, 1102, 1103, and 1104 for this TOF event.

Two lookup tables may be used in both of the non-TOF and TOF PET embodiments discussed above. For every φ, each $LOR_{ij}$ solid angle for each individual point of the point-source array is saved into a first lookup table (Tab-I). As a result, in Tab-I, one $LOR_{ij}$ has multiple solid angles that vary along the t dimension. Further, the $n_d$ for each $LOR_{ij}$ is saved into a second table (Tab-II). The $n_d$ is independent of the point-source array. For the non-TOF PET, one $LOR_{ij}$ (having coordinates (s,φ,z,θ)) is used with Tab-I to obtain all the possible solid angles corresponding to the $LOR_{ij}$, which are then averaged and inverted to generate $n_s$. Similarly, the $LOR_{ij}$ is also used with Tab-II to obtain the $n_d$. Both $n_s$ and $n_d$ are then multiplied together to yield $n_g$ for the non-TOF geometric normalization. On the other hand, for a TOF-PET, one event received at $LOR_{ij}$ includes TOF information (Δt) in addition to the coordinates (s,φ,z,θ). Then, all solid angles corresponding to the $LOR_{ij}$ along the whole t dimension are obtained from Tab-I; Δt is used to compute the emission point t position, which determines which one of the sub-groups (shown in FIG. 11) corresponds to this event. After the subgroup is determined, the solid angles that are included in the subgroup are averaged together and inverted to generate $n_s$. The $n_d$ of the $LOR_{ij}$ is obtained from Tab-II in the same manner as with the non-TOF PET. Both $n_s$ and $n_d$ are then multiplied together to yield $n_g$ for the TOF-PET geometric normalization. Both lookup tables can be either stored in a memory of the PET apparatus, or stored in a non-transitory computer readable storage medium (a storage unit, such as a hard disc, non-volatile memory, volatile memory, CD-ROM, DVD, etc.).

Hardware

Figure 12:
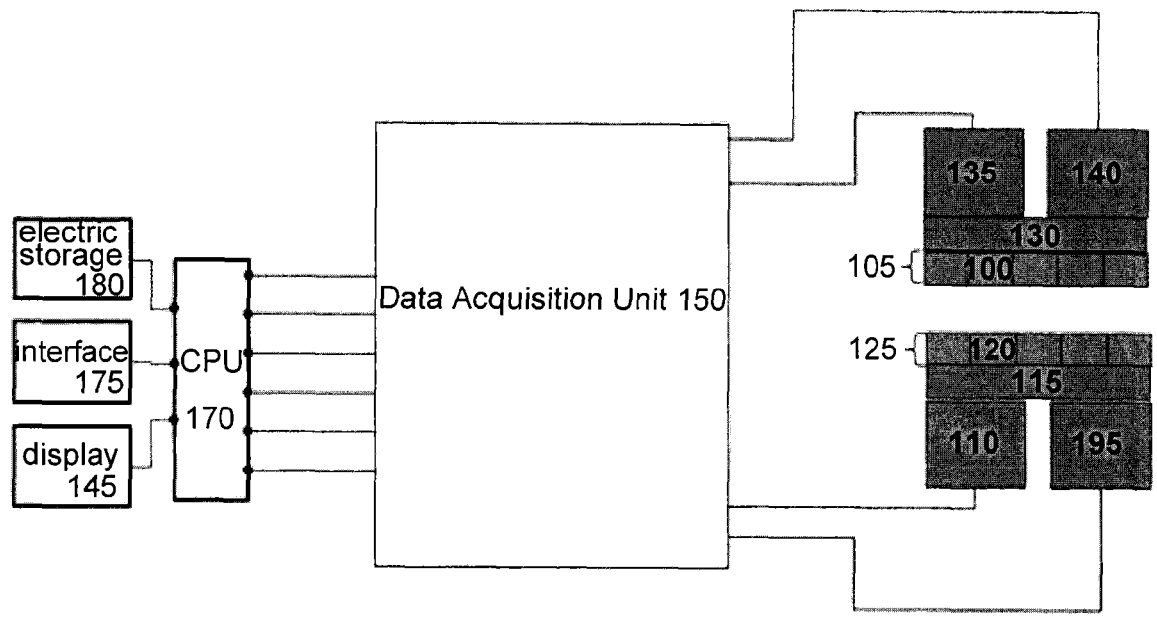
FIG. 12 illustrates an example of a gamma ray detection system.

FIG. 12 shows an exemplary hardware configuration that can be used with the present technological advancement. In FIG. 12, photomultiplier tubes 135 and 140 are arranged over light guide 130, and the array of scintillation crystals 105 is arranged beneath the light guide 130. A second array of scintillation crystals 125 is disposed opposite the scintillation crystals 105 with light guide 115 and photomultiplier tubes 195 and 110 arranged thereover.

In FIG. 12, when gamma rays are emitted from a body under test (not shown), the gamma rays travel in opposite directions, approximately 180° from each other. Gamma ray detection occurs simultaneously at scintillation crystals 100 and 120, and a scintillation event is determined when the gamma rays are detected at scintillation crystals 100 and 120 within a predefined time limit. Thus, the gamma ray timing detection system detects gamma rays simultaneously at scintillation crystals 100 and 120. However, for simplicity only, gamma ray detection is described relative to scintillation crystal 100. One of ordinary skill in the art will recognize, however, that the description given herein with respect to scintillation crystal 100 is equally applicable to gamma ray detection at scintillation crystal 120.

Each photomultiplier tube 110, 135, 140 and 195 is respectively connected to data acquisition unit 150. The data acquisition unit 150 includes hardware configured to process the signals from the photomultiplier tubes. The data acquisition unit 150 measures the arrival time of the gamma ray. The data acquisition unit 150 produces two outputs (one for the combination of PMT 135/140 and one for the combination of PMT 110/195) which encodes the time of the discriminator pulse relative to a system clock (not shown). For a time of flight PET system, the data acquisition unit 150 typically produces a time stamp with an accuracy of 15 to 25 ps. The data acquisition unit measures the amplitude of the signal on each PMT (four of the outputs from data acquisition unit 150).

The data acquisition unit outputs are provided to a CPU, 170, for processing. The processing consists of estimating an energy and position from the data acquisition unit outputs and an arrival time from the time stamps output for each event, and may include the application of many correction steps, based on prior calibrations, to improve the accuracy of the energy, position, and time estimates. As one of ordinary skill in the art would recognize, the CPU 170 can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the CPU 170 may be implemented as a set of computer-readable instructions stored in any of the above-described electronic memories and/or a hard disc drive, CD, DVD, FLASH drive or any other known storage media. Further, the computer-readable instructions may be provided as a utility application, background daemon, or component of an operating system, or combination thereof, executing in conjunction with a processor, such as a Xeon processor from Intel of America or an Opteron processor from AMD of America and an operating system, such as Microsoft VISTA, UNIX, Solaris, LINUX, Apple, MAC-OS and other operating systems known to those skilled in the art.

Once processed by the CPU 170, the processed signals are stored in electronic storage 180, and/or displayed on display 145. As one of ordinary skill in the art would recognize, electronic storage 180 may be a hard disk drive, CD-ROM drive, DVD drive, FLASH drive, RAM, ROM or any other electronic storage known in the art. Display 145 may be implemented as an LCD display, CRT display, plasma display, OLED, LED or any other display known in the art. As such, the descriptions of the electronic storage 180 and the display 145 provided herein are merely exemplary and in no way limit the scope of the present advancements.

FIG. 12 also includes an interface 175 through which the gamma ray detection system interfaces with other external devices and/or a user. For example, interface 175 may be a USB interface, PCMCIA interface, Ethernet interface or any other interface known in the art. Interface 175 may also be wired or wireless and may include a keyboard and/or mouse or other human interface devices known in the art for interacting with a user.

While certain embodiments have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method, comprising:
    determining, with a processor, a line of response for an imaging apparatus, the line of response being defined by respective locations of a pair of detector crystals of the imaging apparatus;
    defining an array of emission points corresponding to the determined line of response;
    determining, for each point in the array of emission points corresponding to the line of response, a solid angle subtended by surfaces of the pair of detector crystals that define the line of response;
    averaging the determined solid angles to generate an average solid angle;
    determining a depth of interaction factor dependent upon penetration of a gamma ray in the pair of detector crystals of the imaging apparatus; and
    calculating a geometric corrective factor for the determined line of response by multiplying a reciprocal of the average solid angle by the determined depth of interaction factor.

2. The method of claim 1, further comprising:
    repeating the steps of defining the array, determining the solid angle, averaging the determined solid angles, determining the depth of interaction factor, and calculating the geometric correction factors for a plurality of lines of response.

3. The method of claim 1, further comprising:
    normalizing data obtained from a scan of an object using the imaging apparatus by applying the calculated geometric corrective factor to the data.

4. The method of claim 1, wherein said array of emission points corresponds to points of gamma ray emission.

5. The method of claim 1, wherein the imaging apparatus is a non-time-of-flight PET apparatus.

6. A method, comprising:
determining, with a processor, a line of response for an imaging apparatus, the line of response being defined by respective locations of a pair of detector crystals of the imaging apparatus;
defining an array of emission points corresponding to the determined line of response;
determining, for each point in the array of emission points corresponding to the line of response, a solid angle subtended by surfaces of the pair of detector crystals that define the line of response;
dividing the array of emission points corresponding to the line of response into subgroups of emission points;
averaging, for each subgroup of emission points, the solid angles determined for each point in the subgroup of emission points to generate an average solid angle for each subgroup of emission points;
determining a depth of interaction factor dependent upon penetration of a gamma ray in the pair of detector crystals of the imaging apparatus; and
calculating plural geometric corrective factors for the determined line of response by multiplying a reciprocal of the average solid angle for each subgroup of emission points by the determined depth of interaction factor.

7. The method of claim 6, further comprising:
repeating the steps of defining the array, determining the solid angle, dividing the array of emission points, averaging the determined solid angles, determining the depth of interaction factor, and calculating the geometric correction factors for a plurality of lines of response.

8. The method of claim 7, further comprising:
generating a table that includes, for each line of response, a solid angle for each individual point on the array of emission points.

9. The method of claim 6, further comprising:
normalizing data obtained from a scan of an object using the imaging apparatus by applying the geometric corrective factors to the data.

10. The method of claim 9, wherein the normalizing step includes selecting, for each annihilation event included in the data, a corresponding geometric corrective factor based on a timing of the annihilation event and a line of response of the annihilation event.

11. The method of claim 10, further comprising:
using the timing of the annihilation event to determine in which subgroup the annihilation event belongs.

12. The method of claim 6, wherein said array of emission points corresponds to points of gamma ray emission.

13. The method of claim 6, wherein the imaging apparatus is a time-of-flight (TOF) PET apparatus.

14. The method of claim 13, wherein the dividing step comprises:
dividing the array of emission points corresponding to the line of response into subgroups of emission points based on a timing resolution of the TOF PET apparatus.

15. An apparatus, comprising:
a processor configured to execute computer executable instructions in order to,
determine a line of response for an imaging apparatus, the line of response being defined by respective locations of a pair of detector crystals of the imaging apparatus,
define an array of emission points corresponding to the determined line of response,
determine, for each point in the array of emission points corresponding to the line of response, a solid angle subtended by surfaces of the pair of detector crystals that define the line of response,
average the determined solid angles to generate an average solid angle,
determine a depth of interaction factor dependent upon penetration of a gamma ray in the pair of detector crystals of the imaging apparatus, and
calculate a geometric corrective factor for the determined line of response by multiplying a reciprocal of the average solid angle by the determined depth of interaction factor.

16. The apparatus of claim 15, further comprising:
a memory storing the geometric corrective factor in association with the determined line of response.

17. An apparatus, comprising:
a processor configured to execute computer executable instructions in order to,
determine a line of response for an imaging apparatus, the line of response being defined by respective locations of a pair of detector crystals of the imaging apparatus,
define an array of emission points corresponding to the determined line of response,
determine for each point in the array of emission points corresponding to the line of response, a solid angle subtended by surfaces of the pair of detector crystals that define the line of response,
divide the array of emission points corresponding to the line of response into subgroups of emission points,
average, for each subgroup of emission points, the solid angles determined for each point in the subgroup of emission points to generate an average solid angle for each subgroup of emission points,
determine a depth of interaction factor dependent upon penetration of a gamma ray in the pair of detector crystals of the imaging apparatus, and
calculate plural geometric corrective factors for the determined line of response by multiplying a reciprocal of the average solid angle for each subgroup of emission points by the determined depth of interaction factor.

18. The apparatus of claim 17, further comprising:
a memory storing the geometric corrective factor in association with the determined line of response.

19. A non-transitory computer readable storage medium encoded with instructions, which when executed by a computer causes the computer to implement a method comprising:
determining a line of response for an imaging apparatus, the line of response being defined by respective locations of a pair of detector crystals of the imaging apparatus;
defining an array of emission points corresponding to the determined line of response;
determining, for each point in the array of emission points corresponding to the line of response, a solid angle subtended by surfaces of the pair of detector crystals that define the line of response;
averaging the determined solid angles to generate an average solid angle;
determining a depth of interaction factor dependent upon penetration of a gamma ray in the pair of detector crystals of the imaging apparatus; and
calculating a geometric corrective factor for the determined line of response by multiplying a reciprocal of the average solid angle by the determined depth of interaction factor.

20. A non-transitory computer readable storage medium encoded with instructions, which when executed by a computer causes the computer to implement a method comprising:
- determining a line of response for an imaging apparatus, the line of response being defined by respective locations of a pair of detector crystals of the imaging apparatus;
- defining an array of emission points corresponding to the determined line of response;
- determining, for each point in the array of emission points corresponding to the line of response, a solid angle subtended by surfaces of the pair of detector crystals that define the line of response;
- dividing the array of emission points corresponding to the line of response into subgroups of emission points;
- averaging, for each subgroup of emission points, the solid angles determined for each point in the subgroup of emission points to generate an average solid angle for each subgroup of emission points;
- determining a depth of interaction factor dependent upon penetration of a gamma ray in the pair of detector crystals of the imaging apparatus; and
- calculating plural geometric corrective factors for the determined line of response by multiplying a reciprocal of the average solid angle for each subgroup of emission points by the determined depth of interaction factor.

* * * * *